(12) United States Patent
Lingman et al.

(10) Patent No.: US 8,108,117 B2
(45) Date of Patent: Jan. 31, 2012

(54) METHOD AND ARRANGEMENT FOR MEASURING AND ESTIMATING A BRAKE FACTOR IN A VEHICLE BRAKE SYSTEM

(75) Inventors: Peter Lingman, Hindås (SE); Jan-Inge Svensson, Göteborg (SE); Sören Bystedt, Torslanda (SE)

(73) Assignee: Volvo Lastvagnar AB, Gothenburg (SE)

( * ) Notice: Subject to any disclaimer, the term of this patent is extended or adjusted under 35 U.S.C. 154(b) by 268 days.

(21) Appl. No.: 12/445,303

(22) PCT Filed: Oct. 5, 2007

(86) PCT No.: PCT/SE2007/000887
§ 371 (c)(1),
(2), (4) Date: Jan. 12, 2010

(87) PCT Pub. No.: WO2008/044980
PCT Pub. Date: Apr. 17, 2008

(65) Prior Publication Data
US 2010/0211279 A1 Aug. 19, 2010

(30) Foreign Application Priority Data
Oct. 13, 2006 (SE) .................................... 0602157-0

(51) Int. Cl.
*B60T 7/00* (2006.01)
(52) U.S. Cl. .......................................... 701/70; 303/9.69
(58) Field of Classification Search .................... 701/48, 701/70–83; 303/6.1, 7, 8, 9.69, 9.71, 121–124, 303/151–155, 166–167, 191; 188/2 A, 4 B, 188/18 A, 24, 65.3, 84, 206 R, 217, 218 R, 188/271, 272, 361, 362, 369; 477/4, 9, 21–29, 477/40, 47, 71, 92, 94, 170, 172, 182–184, 477/188, 194, 196, 198, 199, 201–205, 208, 477/211; 475/43, 224; 280/11, 28.11, 264; 301/5, 6
See application file for complete search history.

(56) References Cited

U.S. PATENT DOCUMENTS
5,414,466 A    5/1995   Noreve et al.
5,482,359 A *   1/1996   Breen ........................ 303/9.69
(Continued)

FOREIGN PATENT DOCUMENTS
DE     2622746 A1    11/1977
(Continued)

OTHER PUBLICATIONS
International Search Report for corresponding International Application PCT/SE2007/000887.

*Primary Examiner* — Mary Cheung
(74) *Attorney, Agent, or Firm* — WRB-IP LLP

(57) ABSTRACT

The invention relates to a method for measuring and estimating a brake factor in a vehicle brake system, said vehicle including a towing vehicle and a trailer having a plurality of wheel axles, wherein said method includes: initiating a controlled braking manoeuvre involving at least a first wheel axle and a second wheel axle; and obtaining values representing said brake factor for said wheel first wheel axle and said second wheel axle by a control unit which is provided with a brake adaptation function to obtain a brake balance between said towing vehicle and said trailer. The method furthermore includes: braking, in a forced manner, said first wheel axle when retardation of said vehicle is requested; estimating the brake factor for said first wheel axle by determining the brake pressure and braking torque for said first wheel axle; providing a transition phase after which said second wheel axle is braked, in a forced manner, and estimating the brake factor for said second wheel axle by determining the brake pressure and braking torque for said second wheel axle. An arrangement for measuring and estimating the brake factor in a vehicle brake system is also disclosed.

7 Claims, 3 Drawing Sheets

Principal signal flow for the friction estimation algorithm.

U.S. PATENT DOCUMENTS

| | | | |
|---|---|---|---|
| 5,496,098 A * | 3/1996 | Brearley | 303/22.2 |
| 5,588,716 A * | 12/1996 | Stumpe | 303/7 |
| 7,134,733 B2 * | 11/2006 | Eckert et al. | 303/123 |
| 7,561,953 B2 * | 7/2009 | Yu | 701/78 |
| 7,809,486 B2 * | 10/2010 | Haller et al. | 701/70 |
| 2005/0017577 A1 | 1/2005 | Eckert et al. | |
| 2006/0273657 A1 * | 12/2006 | Wanke et al. | 303/146 |

FOREIGN PATENT DOCUMENTS

| | | |
|---|---|---|
| DE | 3921309 A1 | 1/1991 |
| DE | 4241149 A1 | 6/1994 |
| SE | 518952 C2 | 12/2002 |

* cited by examiner

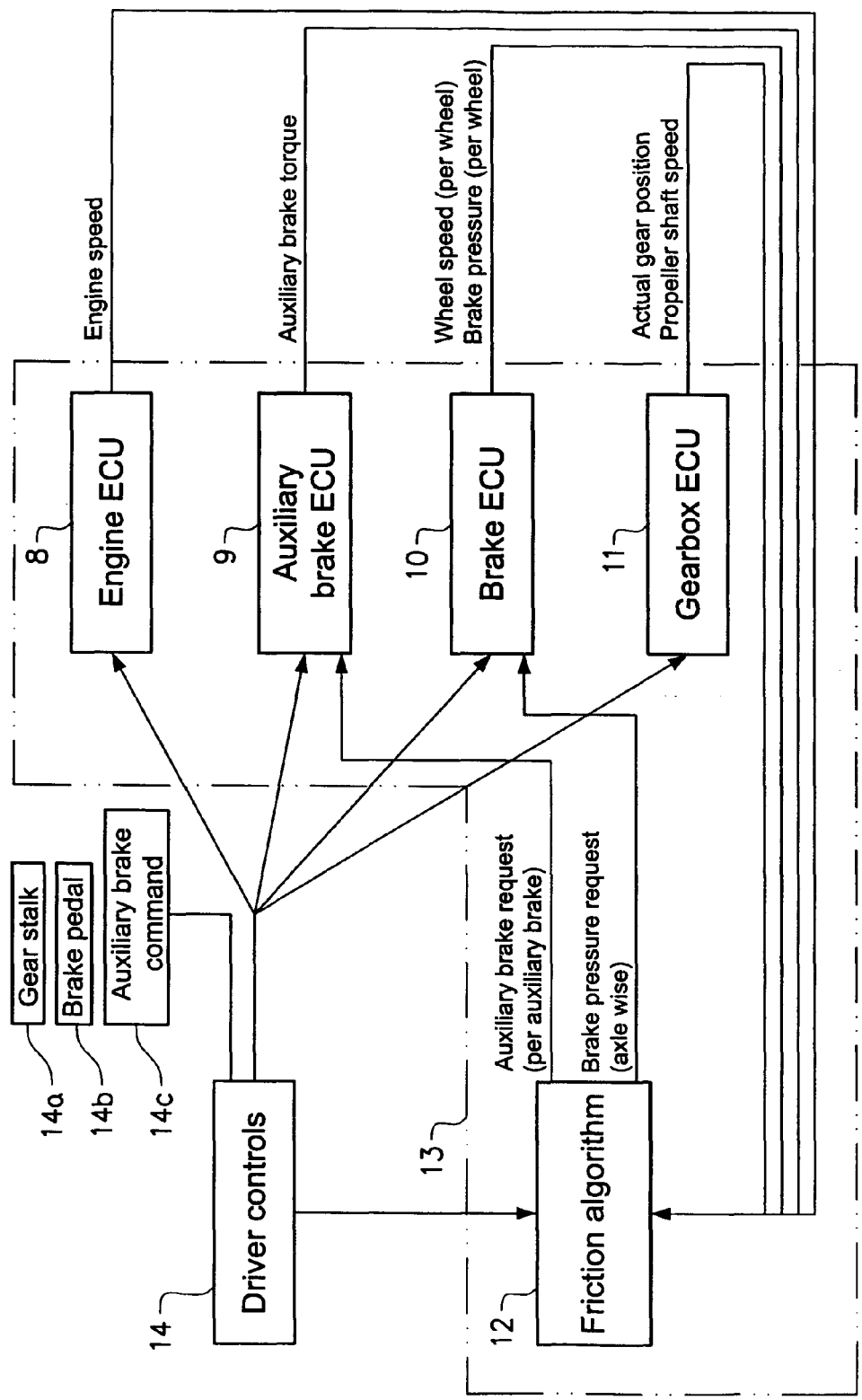
FIG. 2  Principal signal flow for the friction estimation algorithm.

METHOD AND ARRANGEMENT FOR MEASURING AND ESTIMATING A BRAKE FACTOR IN A VEHICLE BRAKE SYSTEM

BACKGROUND AND SUMMARY

The present invention relates to a method for measuring and estimating a brake factor in a vehicle brake system, said vehicle comprising a towing vehicle and a trailer having a plurality of wheel axles, wherein said method comprises: initiating a controlled braking manoeuvre involving at least a first wheel axle and a second wheel axle; and obtaining values representing said brake factor for said first wheel axle and said second wheel axle by means of a control unit which is provided with a brake adaptation function to obtain a brake balance between said towing vehicle and said trailer.

The invention also relates to an arrangement for measuring and estimating a brake factor in a vehicle brake system, said vehicle comprising a towing vehicle and a trailer having a plurality of wheel axles, wherein said arrangement furthermore comprises a control unit adapted for initiating a controlled braking manoeuvre involving at least a first wheel axle and a second wheel axle, and for obtaining values representing said brake factor for said first wheel axle and said second wheel axle, said control unit being provided with a brake adaptation function to obtain a brake balance between said towing vehicle and said trailer.

Heavy motor vehicles, such as load-carrying commercial vehicles, are normally designed with different brake systems, for example wheel brakes (i.e. disc brakes), a hydraulic retarder and an engine brake.

Also, today's commercial vehicles are often arranged as vehicle combinations comprising a tractor, i.e. a towing vehicle, and a trailer. Such vehicles are often provided with an electronically controlled pneumatic brake system in order to control the wheel brakes. A brake system of this kind is normally based on a computerized control unit which may be arranged so as to distribute the requisite brake pressure in a suitable manner between the brakes of the tractor and the trailer. This distribution function is sometimes referred to as a "coupling force control", or a "brake adaptation function". By means of such a function, a high degree of brake compability, or brake balance, between the tractor and the trailer can be obtained. In other words, the aim with a brake adaptation function is to distribute the brake pressure in an optimum manner between the tractor and the trailer.

In the event of a poor brake balance, the stability, efficiency and safety of the vehicle combination will be influenced in a negative manner. As an example of an inferior brake balance, a situation can be mentioned in which the trailer does not brake sufficiently well, whereas the braking operation of the tractor is sufficient. As a result of this poor brake balance, an unwanted pushing force will arise in the coupling between tractor and trailer during braking. The tractor then has to brake both its own load and also a certain force from the trailer in order to achieve the necessary brake retardation. This means that the brakes of the tractor may become too warm, which causes them to be worn out too quickly. This means that the efficiency and stability of the brakes may be deteriorated.

On the other hand, if perfect brake balance is obtained, each axle is braking exactly its load and there is a high degree of compatibility between the tractor and the trailer.

In order to control the brake balance of the tractor and the trailer, the so-called "brake factor", or "brake gain", is used as an input parameter to the brake control unit. The brake factor, normally designated Bf, can be defined as a relation between the received brake torque and the applied brake cylinder pressure for a given wheel axle, i.e.

$$Bf = T\text{brake}/P\text{cyl} \ [\text{Nm/bar/axle}]$$

wherein Tbrake indicates the received brake torque for the axle in question, and wherein Pcyl indicates the applied brake cylinder pressure for said axle. By determining a value which represents the brake factor Bf for each axle of a vehicle, the control unit may be operated so as to achieve the above-coupling force control. More precisely, tests can be carried out for a certain wheel axle wherein the applied brake pressure Pcyl (i.e. the pressure acting on a wheel brake disc by means of a corresponding brake pad) is measured while the retardation of the free rolling axle is also measured during braking. A value representing the retardation can be obtained by means of an accelerometer. By measuring the retardation, a value representing the brake torque Tbrake can be calculated. When calculating the brake torque Tbrake, certain factors such as the air resistance and the rolling resistance must be compensated for. By using the values of the brake torque Tbrake and the brake pressure Pcyl, the brake factor Bf can be calculated using the above-mentioned relationship.

Consequently, the brake factor Bf can be regarded as a value which represents the efficiency of the brakes. Also, a low brake factor may for example indicate possible malfunctions in the brakes. For example, the contact area of the brakes might be contaminated with dirt or rust, which means that it will need conditioning.

Generally it can be said that the purpose of an ideal braking system is to brake the vehicle in a controlled, stable and predefined way in order to stop the vehicle in the shortest possible distance no matter what the road, load or weather conditions are. Also, the various parts in the system should not become worn or become unnecessarily warm. In order to achieve this purpose, it is of great importance to obtain status information regarding the brakes. Such information can be obtained by means of the above-mentioned brake factor Bf.

Furthermore, it is previously known that the brake pressure distribution between the tractor and the trailer is based on an assumption that the brake factor Bf for each axle is known and also that it is considered to be constant This means that a brake control unit is provided with a constant value representing an approximation of the brake factor Bf for each wheel axle.

However, even though a constant value may be a relatively accurate approximation of the brake factor Bf for a given axle, it can be noted that relatively large variations of the brake factor Bf may occur during certain operating conditions of a vehicle. Variations in the brake factor Bf can easily lead to an inferior brake balance between the tractor and the trailer, which obviously is a disadvantage.

Consequently, there is a need for systems and methods for improving the above-mentioned coupling force control by using a correct input value representing the brake factor Bf during different operating conditions. In this manner, the brake pressure between the tractor and the trailer can be distributed in an improved manner.

According to prior art, it can be noted that the patent document U.S. Pat. No. 5,414,466 teaches a system for determining relative brake factors in a vehicle. The system is arranged so as to provide a value of the brake factor of a vehicle by means of a method in which the vehicle is decelerated while the braking pressure is measured and recorded for each braking location. However, a disadvantage with the system according to U.S. Pat. No. 5,414,466 is that it does not take into account the fact that the brake factor may vary in accordance with different operating conditions.

It is desirable to provide a method and an arrangement for measuring and estimating a brake factor in a vehicle brake system, which overcomes the above-mentioned drawbacks and problems associated with previously known devices.

A method according to an aspect of the present invention comprises the following steps: braking, in a forced manner, said first wheel axle when retardation of said vehicle is requested; estimating the brake factor for said first wheel axle by determining the brake pressure and braking torque for said first wheel axle; providing a transition phase after which said second wheel axle is braked, in a forced manner, and estimating the brake factor for said second wheel axle by determining the brake pressure and braking torque for said second wheel axle.

In an arrangement according to an aspect of the present invention, said control unit furthermore is adapted for carrying out a braking, in a forced manner, of said first wheel axle when retardation of said vehicle is requested, for estimating the brake factor for said first wheel axle by determining the brake pressure and braking torque for said first wheel axle, for providing a transition phase after which said second wheel axle is braked, in a forced manner, and for estimating the brake factor for said second wheel axle by determining the brake pressure and braking torque for said second wheel axle.

By means of the invention, certain advantages can be obtained. Firstly, it can be noted that the invention relies on the insight that the brake factor in fact varies depending on various factors, in particular the velocity, the load on the brake pad and the brake pad temperature. This means that by using this knowledge, the invention can be arranged for an improved brake adaptation function. In this manner, an improved brake compatibility between a towing vehicle and a trailer can be obtained. This may also lead to improved safety as well as a reduced repair cost due to bad distribution between truck and trailer.

BRIEF DESCRIPTION OF THE DRAWINGS

The invention will now be described in more detail with reference to a preferred exemplary embodiment and to the drawings attached, in which:

FIG. 2 is a schematic diagram of different control functions being used in an arrangement for measuring and estimating the brake factor according to the invention;

DETAILED DESCRIPTION

The present invention relates to a method and an arrangement for measuring and estimating the brake factor in a brake system for a vehicle. The invention is particularly, but not exclusively, intended to be used in load-carrying commercial vehicles.

Figure 1:
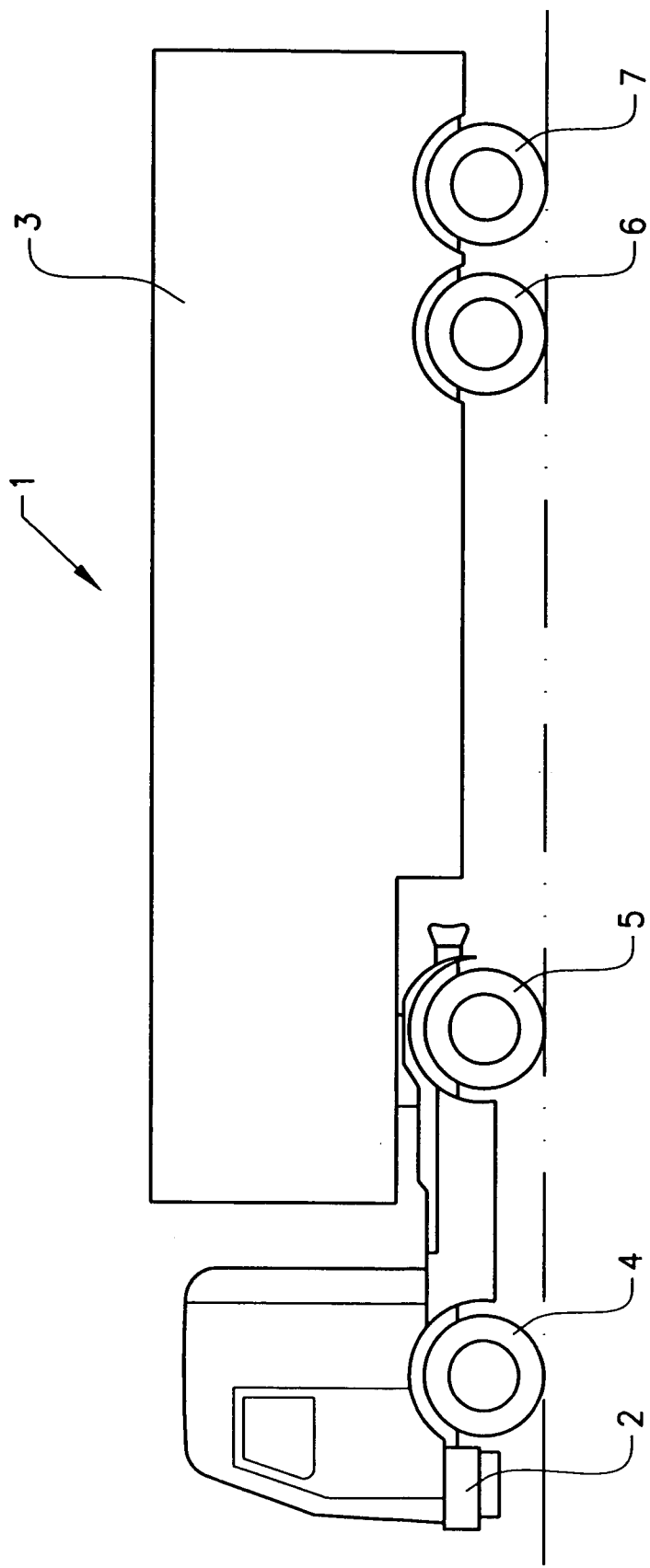
FIG. 1 shows a simplified view of a vehicle combination comprising a tractor and a trailer, in which the present invention can be used.

FIG. 1 is a simplified and schematical side view showing a load-carrying commercial vehicle 1, or rather a vehicle combination, in which the present invention can be used. The commercial vehicle 1 comprises a tractor (i.e. a towing vehicle) 2 and a trailer 3. The trailer 3 shown in FIG. 1 is of the semitrailer type, but the invention can be used generally with any vehicle combination involving a tractor vehicle and a trailer. The tractor 2 is detachably coupled to the trailer 3 in a conventional manner involving a fifth wheel arrangement (not shown in detail).

Furthermore, the tractor 2 is equipped with a front wheel axle 4, which suitably is steerable and non-driven, and a rear wheel axle 5, which suitably is a drive axle for the tractor 2. Also, the trailer 3 is preferably provided with two tandem trailer wheel axles 6, 7.

It should be noted that the invention can be used for different types of vehicle combinations. For example, the tractor could equally well be of the type which has a front-wheel-drive system. Also, the tractor may alternatively be provided with two drive wheel axles. Furthermore, the trailer may be provided with one or more axles, which can be steerable or non-steerable, and which can be driven or non-driven. Generally, the invention can be used in vehicle combinations having any number of drive axles and non-driven axles.

With reference to FIG. 2, there is shown a schematic diagram of various components used according to the principles of the present invention, in order to measure and estimate the brake factor of one or more of the wheel axles 4, 5, 6, 7 of the vehicle 1. In the example which is to be described below, the brake factors of the two axles 4, 5 of the tractor 2 will be determined. These two brake factors are designated Bf1 and Bf2, respectively. It should be noted that the brake factors may be different for each axle.

Also, it can be noted that FIG. 2 shows various computerized control functions in the vehicle 1, in particular an engine control unit 8, an auxiliary brake control unit 9, a brake control unit 10 and a gearbox control unit 11. These control units 8, 9, 10, 11 are connected to a function block in the form of a friction algorithm unit 12. Even though all these control units 8-12 are shown as separate blocks or components in FIG. 2, it should be noted that they may be combined as different computer-based functions within a single computerized control unit 13, as indicated with broken lines in FIG. 2.

The brake control unit 10 is arranged to control a plurality of brake functions (not shown in FIG. 2) within the vehicle 1, in particular a set of pneumatically controlled wheel brakes for each of the wheel axles of the vehicle 1, an auxiliary brake which is preferably in the form of a retarder, and an engine brake. These control functions of the brake control unit 10 are previously known as such, and for this reason they are not described in detail here.

Also, the vehicle 1 comprises a number of driver controls 14, i.e. controls which are accessible to the driver of the vehicle 1 and can be operated in order to actuate various brake functions. The driver controls 14 are schematically shown in FIG. 2 and preferably include a selector stalk 14a, a brake pedal 14b and an auxiliary brake command unit 14c. The selector stalk 14a is used in a manner which is previously known to select whether the wheel brakes or the auxiliary brake, or both, shall be allowed to be activated. The brake pedal 14b, suitably a foot brake pedal of a known type, is used by the driver of the vehicle to manually actuate the wheel brakes.

Finally, the auxiliary brake command unit 14c is specifically used for actuating said auxiliary brake, i.e. the retarder.

As shown in FIG. 2, signals representing the condition of the driver controls 14 are fed to the control units 8, 9, 10, 11 and to the friction algorithm unit 12. Also, signals representing various operating conditions are fed from each of these control units 8, 9, 10, 11 to the friction algorithm unit 12. More precisely, a signal representing the vehicle's 1 engine speed is output from the engine control unit 8, a signal representing the auxiliary brake torque is output from the auxiliary brake control unit 9, signals representing the wheel speed (for each wheel) and the brake pressure (for each wheel) are output from the brake control unit 10 and signals representing the gear position of a gearbox and the speed of a propeller shaft are output from the gearbox control unit 11. All these signals are fed to the friction algorithm unit 12. Also, signals representing an auxiliary brake request (for each auxiliary brake unit) and a brake pressure request (for each wheel axle), respectively, are output from the friction algorithm unit 12 to the auxiliary brake control unit 9 and the brake control unit 10, respectively.

The invention constitutes a method and an arrangement for determining the actual brake factor for each brake or each axle or for each controlled brake channel on the tractor 2 during normal driving. The main purpose of the invention is to improve a brake balance between the tractor 2 and the trailer 3 by means of an improved brake adaptation function. For this reason, it is a main principle of the present invention that a continuous update of the brake factor for any of the axles is provided by the friction algorithm unit 12. The updated values of the brake factor which are obtained are then used to provide a brake adaptation function, which in turn is used by the brake control unit 10 to achieve a brake balance between the tractor 2 and said trailer 3.

The brake adaptation function of the brake control unit 10 is arranged to handle the brake cylinder pressure between the tractor 2 and the trailer 3 so that a stable braking progression is achieved. To this end, the brake factor is used by the brake adaptation function in the brake control 10 as a base for distributing the brake pressure to the trailer's 3 wheel brakes. In order to obtain this, the retardation which follows from a certain brake pressure is estimated, i.e. what the brake factor is for each axle 4, 5 of the tractor 2. It can be noted that if the brake factors Bf1, Bf2 for each of the tractor's 2 axles 4, 5 are known (and if the brake cylinder pressure is known), the entire brake force which can be obtained by the tractor 2 can be determined.

The invention is based on the insight that the brake factor Bf is in fact not constant during operation of the vehicle 1, but may vary at certain operation conditions. For example, it has been noted that the vehicle speed, the load on the brake pads of the wheel brakes, and also the brake pad temperature, are factors which contribute to variations of the brake factor Bf. For this reason, it is a main purpose of the present invention to provide an improved method and arrangement for obtaining a value of the brake factor Bf. In order to achieve this purpose, the invention is arranged so that, at suitable brake applications, the brake pressure is distributed only (or at least mainly) to individual brakes, or axles, or brake channels, on the tractor 2 to determine the actual brake force as a function of speed, brake pressure and estimated brake temperature.

Figure 3:
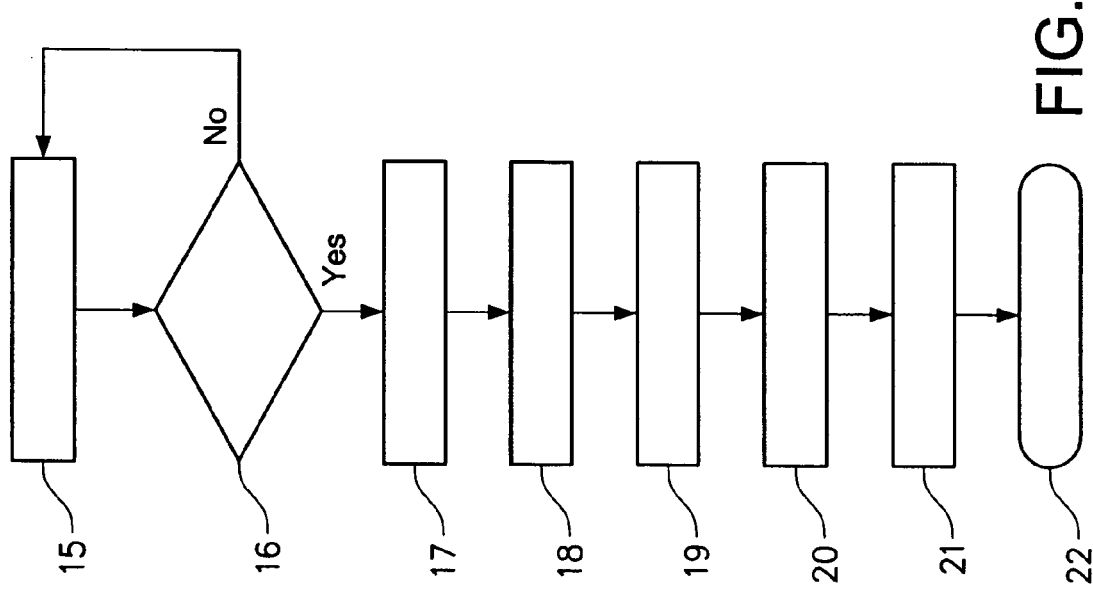
FIG. 3 is a flow chart representing the manner in which the brake factor is obtained in accordance with the invention.

According to the shown embodiment, a measurement and estimation of a brake factor Bf is carried out during operation of the vehicle 1, at a non-critical situation (i.e. from a safety point of view) when retardation of the vehicle 1 is requested by the driver. This is preferably initiated at a moment when the driver needs to activate the vehicle's auxiliary brakes. With reference to FIG. 3, which is a flow chart showing the process of determining the brake factor Bf according to the embodiment, a normal driving condition is indicated by means of reference numeral 15. At a certain point in time while driving, it is assumed that the driver needs to use the auxiliary brake, as shown by reference numeral 16. Such a situation may for example occur if the vehicle is driven along a downhill slope. In such case, a process for updating the brake factors Bf1, Bf2 for each of the wheel axles 4, 5 of the tractor 2 is started. In the following, a process will be described in which the brake factor Bn for the front wheel axle 4 will be determined first. However, the invention can also be implemented in a manner wherein the brake factor Bf2 for the rear wheel axle 5 is determined first.

When the driver intends to activate the auxiliary brake, which is done by releasing the accelerator pedal (not shown) and by actuating the auxiliary brake command 14c, the brake control unit 10 is instead arranged to first update the brake factor Bn of the front wheel axle 4 of the tractor 2. This update procedure is done by first actuating the brakes of the front wheel axle 4, as shown by reference numeral 17. In particular, the brake control unit 10 is then arranged to apply a brake pressure which corresponds to the intended and requested auxiliary brake torque. This condition is suitably maintained until the retardation is stable and the various parameters for the brake factor Bf1 can be measured. Consequently, during this stage, the retardation of the rear wheel axle 5 is measured, suitably by means of existing wheel speed sensors (not shown) in the vehicle 1. Also, a value of the mass of the vehicle is needed in order to estimate the brake factor Bf1. The mass can for example be obtained by means of information relating to the engine torque and through signals from existing sensors indicating the speed of the wheels. Consequently, by obtaining signals representing the retardation speed and the mass of the vehicle, the braking torque Tbrake1 for the front axle 4 is obtained. Alternatively, the mass can be determined by using an accelerometer, or through the use of a signal from existing sensors indicating the pressure of the pneumatic brake system of the vehicle.

As an alternative to the above-mentioned procedure, the estimation of the brake factors for the wheel axles can be initiated when the driver activates a service brake in the vehicle in question.

Furthermore, a signal representing the brake pressure Pcyl1 of the front axle 4 can be obtained by means of an existing pressure sensor (not shown) being arranged in the brake system. Consequently, all the various signals for obtaining the brake factor Bfi are now obtained, and an updated value for the brake factor Btt can be estimated by means of a calculation in the brake control unit 10, as indicated by reference numeral 18 in FIG. 3. This calculation is carried out in accordance with the relationship Bf1=Tbrake1/Pcyl1, as described above.

After the brake factor Bf1 for the front axle has been obtained, the brake control unit 10 goes into a transition, or change-over, phase (reference numeral 19) in which the brake pressure applied to the front axle 4 is gradually decreased while the brake pressure applied to the rear axle 5 is gradually increased. When the rear axle 5 is braked with a force which corresponds to the intended auxiliary brake torque as requested by the driver, and as indicated with reference numeral 20, a procedure for obtaining the brake factor Bf2 for the rear wheel axle 5 is carried out. This latter procedure, as indicated with reference numeral 21, corresponds to what has been described above with regard to the front wheel axle 4. Finally, the process for measuring the brake factors Bf1, Bf2 is terminated, see reference numeral 22. At this stage, the rear axle 5 brake is deactivated and the auxiliary brake is suitably activated, as originally requested by the driver of the vehicle.

Figure 4:
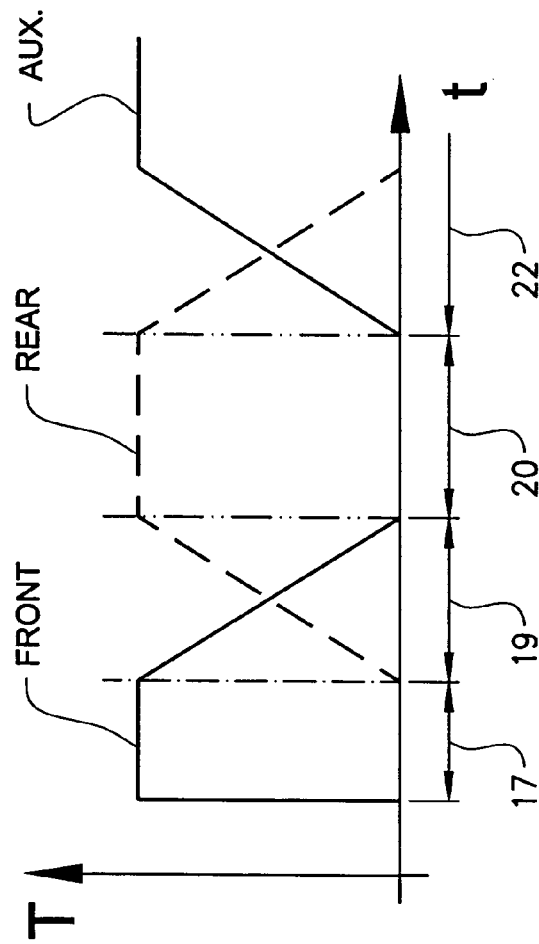
FIG. 4 shows a diagram corresponding to the process described with reference to FIG. 3.

The process for measuring the two values of the brake factor Bf1, Bf2 can alternatively be illustrated as shown in FIG. 4, which is a diagram showing the process involving the "imitation" of the auxiliary brake operation as described with reference to FIG. 3. The y axis in the diagram in FIG. 4 represents the brake torque T applied to the front axle 4 and the rear axle 5, whereas the x axis represents time t.

The process as shown in FIG. 4 is initiated when the driver requests retardation of the vehicle 1 and when the intention is to apply the auxiliary brake. Instead of applying the auxiliary brake, however, the brakes of the front wheel axle 4 are applied in a forced manner, with a brake force which corresponds to the intended auxiliary brake torque. This phase is shown in FIG. 4 as a first phase indicated with reference numeral 17 (see also FIG. 3). The graph shown in FIG. 4 referred to as "FRONT" represents to this phase 17 in which the brakes of the front wheel axle 4 are applied in a forced manner. During this phase, the brake factor Bf1 for the front wheel axle 4 is also measured. The next phase shown represents the transition phase (reference numeral 19) in which the brake pressure applied to the rear axle 5 is gradually increased.

When the rear axle 5 solely is braked (also with a force which corresponds to the intended auxiliary brake torque), as indicated with reference numeral 20, a procedure for obtaining the brake factor Bf2 for the rear wheel axle 5 is carried out, as described above. Consequently, the graph shown in FIG. 4 referred to as "REAR" represents to this phase 20 in which the brakes of the rear wheel axle 5 are applied in a forced manner.

After the brake factors Bf1, Bf2 have been measured, the process continues with application of the auxiliary brake, as indicated with reference numeral 22 in FIG. 4. Also, at this stage, the brake control unit 10 is provided with information regarding these brake factors Bf1, Bf2. Also, the graph shown in FIG. 4 referred to as "AUX" represents to this phase 22 in which the auxiliary brakes are applied.

Furthermore, and in accordance with the preferred embodiment, a normalization procedure is also carried out. This normalization procedure is a calculation which is carried out in order to eliminate the influence of certain parameters upon the values of the brake factor. According to the embodiment, a measured value of a brake factor Bf is normalized according to certain parameters, suitably the vehicle velocity, the brake pad temperature and the brake pressure. This means that the normalized brake factor Bfnorm is determined by means of the measured brake factor Bf and a function f which depends on the velocity, the brake pad temperature and the brake pressure, i.e.

$$Bfnorm = 1/f(v,P,T)$$

where v represents the velocity, P represents the brake pressure and T represents the brake pad temperature. The function f(v, P, T) is suitably determined by means of test drives with a given type of vehicle combination, in order to determine the influence of the three variables (i.e. the velocity v, the brake pressure P and the brake pad temperature T) upon the brake factor. In other words, such test drives are carried out to provide a mapping which estimates the brake factor according to these three variables. An alternative manner of determining the function f(v, P, T) is by carrying out a stationary test involving only the components of the braking system, i.e. without actually test driving a vehicle combination.

In a real-time braking situation during normal driving, i.e. when a measured brake factor is to be used by means of the brake control unit 10 to achieve a brake balance between the tractor 2 and the trailer 3, a normalized brake factor Bfnorm is multiplied with the above-mentioned function f(v, P, T) in order to determine an estimated value of the actual brake factor Bf1 i.e.

$$Bf = Bfnorm * f(V,P,T)$$

In accordance with a preferred embodiment, the final estimation of the brake factor Bf is based on a calculation involving a mean value of the normalized brake factor Bfnorm, for example a mean value based on a number of values of normalized brake factors, for example the ten latest calculations of the normalized brake factor. This means that the estimated value of the brake factor Bf is determined by means of the following relationship:

$$Bf = mean(Bfnorm) * f(v,P,T)$$

where mean(Bfnorm) corresponds to a mean value of a pre-determined number of normalized brake factors. This estimated value of the brake factor Bf can now continuously be used as an input to the brake adaptation function of the brake control unit 10. In this manner, the brake pressure can be distributed in an optimal manner between the tractor 2 and the trailer 3. In particular, the brake adaptation function calculates and adjusts the pressure provided to the trailer 3. As an example, if the actual retardation of the vehicle combination 1 differs from what is expected based on cylinder pressure Bfnorm and mass, the brake adaption function will modify the pressure to the trailer 3. If the brake adaptation function distributes the pressure this way, brake balance between the tractor 2 and the trailer 3 can be obtained.

The invention is not limited to the embodiment described above, but may be modified without departing from the scope of the claims below. For example, the invention can in principle be used in all types of vehicle combinations involving a tractor and a trailer. The invention is therefore not limited to use in a vehicle combination of the type described above.

The invention can be used for estimating a brake factor, which in turn can be used for other functions, for example control and diagnosis of the braking capacity of a vehicle. This could be of use in different types of vehicles, for example trucks and buses.

Furthermore, the function f(v, P, T) as mentioned above can alternatively be modified to include dependencies of other parameters than the velocity, pressure and temperature, as well as dependencies relating to previous braking operations.

The invention claimed is:

1. A method for measuring and estimating a brake factor in a vehicle brake system, the vehicle comprising a towing vehicle and a trailer having a plurality of wheel axles, comprising:
   initiating a controlled braking manoeuvre involving at least a first wheel axle and a second wheel axle; and
   obtaining values representing the brake factor for the first wheel axle and the second wheel axle by means of a control unit which is provided with a brake adaptation function to obtain a brake balance between the towing vehicle and the trailer;
   braking, in a forced manner, the first wheel axle when retardation of the vehicle is requested;
   estimating the brake factor for the first wheel axle by determining the brake pressure and braking torque for the first wheel axle;
   providing a transition phase after which the second wheel axle is braked, in a forced manner; and
   estimating the brake factor for the second wheel axle by determining the brake pressure and braking torque for the second wheel axle.

2. A method according to claim 1, wherein a normalized brake factor is calculated using a value of a measured brake factor and a function representing a mapping of dependencies from at least one variable influencing the brake factor.

3. A method according to claim 2, wherein during normal driving with the vehicle, a value of the brake factor is estimated by multiplying the function with at least one value representing a normalized brake factor.

4. A method according to claim 3, wherein the brake factor is estimated using a mean value of a predetermined number of values representing the normalized brake factor.

5. A method according to claim 1, wherein the forced braking of the first wheel axle generally corresponds to the brake force provided through actuation of an auxiliary brake in the vehicle.

6. A method according to claim 1, wherein the step of providing a transition phase comprises a gradual decrease of the braking of the first wheel axle and a gradual increase of the braking of the second wheel axle.

7. A device for measuring and estimating a brake factor in a vehicle brake system, the vehicle comprising a towing vehicle and a trailer having a plurality of wheel axles, wherein the device furthermore comprises: a control unit adapted for initiating a controlled braking manoeuvre involving at least a first wheel axle and a second wheel axle, and for obtaining values representing the brake factor for the first wheel axle and the second wheel axle, the control unit being provided with a brake adaptation function to obtain a brake balance between the towing vehicle and the trailer; wherein the control unit furthermore is adapted for carrying out a braking, in a forced manner, of the first wheel axle when retardation of the vehicle is requested, for estimating the brake factor for the first wheel axle by determining the brake pressure and braking torque for the first wheel axle, for providing a transition phase after which the second wheel axle is braked, in a forced manner, and for estimating (20) the brake factor for the second wheel axle by determining the brake pressure and braking torque for the second wheel axle.

* * * * *